(12) United States Patent
Zubrin et al.

(10) Patent No.: US 7,871,036 B2
(45) Date of Patent: Jan. 18, 2011

(54) APPARATUS FOR GENERATION AND USE OF LIFT GAS

(75) Inventors: Robert M. Zubrin, Indian Hills, CO (US); Mark H. Berggren, Golden, CO (US); Dan Harber, Greeley, CO (US); Heather Ann Rose, Lakewood, CO (US)

(73) Assignee: Pioneer Astronautics, Lakewood, CO (US)

( * ) Notice: Subject to any disclaimer, the term of this patent is extended or adjusted under 35 U.S.C. 154(b) by 0 days.

(21) Appl. No.: 12/767,615

(22) Filed: Apr. 26, 2010

(65) Prior Publication Data

US 2010/0200693 A1 Aug. 12, 2010

Related U.S. Application Data

(62) Division of application No. 11/422,486, filed on Jun. 6, 2006, now Pat. No. 7,735,777.

(51) Int. Cl.
B64B 1/62 (2006.01)
(52) U.S. Cl. .............................. 244/98; 244/31; 244/32; 446/220
(58) Field of Classification Search .................. 244/98, 244/31, 33, 63, 135 R; 446/220
See application file for complete search history.

(56) References Cited

U.S. PATENT DOCUMENTS

| 2,595,979 | A | 5/1952 | Pevere et al. |
| 3,051,235 | A | 8/1962 | Banks |
| 3,193,006 | A | 7/1965 | Lewis |
| 3,327,782 | A | 6/1967 | Hujsak |
| 3,084,919 | A | 11/1971 | Schlinger et al. |
| 3,725,246 | A | 4/1973 | Kmercak et al. |
| 3,918,263 | A | 11/1975 | Swingle |
| 4,024,912 | A | 5/1977 | Hamrick et al. |
| 4,141,417 | A | 2/1979 | Schora et al. |
| 4,183,405 | A | 1/1980 | Magnie |

(Continued)

FOREIGN PATENT DOCUMENTS

WO WO 03/018958 3/2003

OTHER PUBLICATIONS

Office Action received Jun. 3, 2008 with respect to U.S. Appl. No. 11/422,486, now U.S. Patent No. 7,735,777.

(Continued)

*Primary Examiner*—Christopher P Ellis
(74) *Attorney, Agent, or Firm*—Swanson & Bratschun, L.L.C.

(57) ABSTRACT

A balloon launch unit produces lift gas to enable balloon launch or to allow the prolongation of balloon flight. A method of using the balloon launch unit can include reforming a fuel source by reaction with water to generate hydrogen-rich lift gas mixtures, and injecting the lift gas into a balloon. A reforming operation can include causing the combustion of a combustible material with ambient oxygen for the release of energy; and heating a reforming combination of reaction fuel and water with the energy released from the combustion of the combustible material, to a temperature above that required for the reforming reaction wherein the fuel and water sources are reformed into lift gas. The amount of the combustible material combusted is sufficient to result in the release of enough energy to heat an amount of the reforming reaction fuel and water sources to the temperature above that required for the reforming reaction.

22 Claims, 9 Drawing Sheets

U.S. PATENT DOCUMENTS

| | | |
|---|---|---|
| 4,186,800 A | 2/1980 | Allen |
| 4,217,956 A | 8/1980 | Goss et al. |
| 4,241,790 A | 12/1980 | Magnie |
| 4,299,286 A | 11/1981 | Alston |
| 4,372,386 A | 2/1983 | Rhoades et al. |
| 4,444,257 A | 4/1984 | Stine |
| 4,446,919 A | 5/1984 | Hitzman |
| 4,508,064 A | 4/1985 | Watanabe |
| 4,597,441 A | 7/1986 | Ware et al. |
| 4,622,275 A | 11/1986 | Noguchi et al. |
| 4,659,634 A | 4/1987 | Struthers |
| 4,691,771 A | 9/1987 | Ware et al. |
| 4,706,751 A | 11/1987 | Gondouin |
| 5,033,940 A | 7/1991 | Baumann |
| 5,079,103 A | 1/1992 | Schramm |
| 5,105,887 A | 4/1992 | Hewgill et al. |
| 5,133,406 A | 7/1992 | Puri |
| 5,145,003 A | 9/1992 | Duerksen |
| 5,590,518 A | 1/1997 | Janes |
| 5,674,053 A | 10/1997 | Paul et al. |
| 5,687,559 A | 11/1997 | Sato |
| 5,755,089 A | 5/1998 | Vanselow |
| 5,769,165 A | 6/1998 | Bross et al. |
| 5,769,610 A | 6/1998 | Paul et al. |
| 6,016,867 A | 1/2000 | Gregoli et al. |
| 6,016,868 A | 1/2000 | Gregoli et al. |
| 6,306,917 B1 | 10/2001 | Bohn et al. |
| 6,328,104 B1 | 12/2001 | Graue |
| 6,431,840 B1 | 8/2002 | Mashimo et al. |
| 6,458,478 B1 | 10/2002 | Wang et al. |
| 6,503,649 B1 | 1/2003 | Czajkowski et al. |
| 6,581,684 B2 | 6/2003 | Wellington et al. |
| 6,653,005 B1 | 11/2003 | Muradov |
| 6,821,501 B2 | 11/2004 | Matzakos et al. |
| 6,893,755 B2 | 5/2005 | Leboe |
| 7,056,482 B2 | 6/2006 | Hakka et al. |
| 7,067,456 B2 | 6/2006 | Fan et al. |
| 7,089,907 B2 | 8/2006 | Shinagawa et al. |
| 7,100,692 B2 | 9/2006 | Parsley et al. |
| 2004/0163311 A1 | 8/2004 | Ahmed et al. |
| 2007/0227729 A1 | 10/2007 | Zubrin et al. |

OTHER PUBLICATIONS

Office Action Final received Nov. 12, 2008 with respect to U.S. Appl. No. 11/422,486, now U.S. Patent No. 7,735,777.

Office Action Final received Apr. 16, 2009 with respect to U.S. Appl. No. 11/422,486, now U.S. Patent No. 7,735,777.

Office Action received Jun. 30, 2009 with respect to U.S. Appl. No. 11/422,486, now U.S. Patent No. 7,735,777.

Notice of Allowance received Mar. 3, 2010 with respect to U.S. Appl. No. 11/422,486, now U.S. Patent No. 7,735,777.

Notice of Supplemental Allowance received Apr. 26, 2010 with respect to U.S. Appl. No. 11/422,486 now U.S. Patent No. 7,735,777.

APPARATUS FOR GENERATION AND USE OF LIFT GAS

CROSS REFERENCE TO RELATED APPLICATIONS

This application is a divisional of U.S. patent application Ser. No. 11/422,486 entitled "Apparatus for Generation and Use of Lift Gas", filed Jun. 6, 2006, now U.S. Pat. No. 7,735,777. This application is also related to U.S. patent application Ser. No. 11/392,898 entitled "Apparatus And Method For Extracting Petroleum From Underground Sites Using Reformed Gases", filed Mar. 29, 2006, now U.S. Pat. No. 7,506,685. Each of these patents is hereby incorporated by reference herein.

FIELD OF THE INVENTION

This invention relates to production and use of lift gas and more particularly to production of lift gas for enabling high-altitude balloon launches and balloon flights.

BACKGROUND OF THE INVENTION

High-altitude scientific balloon flights provide useful information on terrestrial and planetary research including research and monitoring of weather, and in particular, research and monitoring of weather from remote locations.

Conventional technology for filling and launching high-altitude balloons depends on having a sufficient quantity of hydrogen, helium or other like lift gas on site or on-board the balloon. Helium gas is difficult to transport due to the need to constrain gases within heavy, high-pressure cylinders. These heavy cylinders make poor candidates for use in remote locations or on-board balloon flights. Hydrogen gas is typically stored in a similar manner as helium gas and additionally is produced by non-portable electrolytic hydrogen generator systems that require large amounts of electrical power. As was the case with helium gas, hydrogen gas is a poor candidate for use in remote locations or on-board balloon flights.

Accordingly, as recognized by the present inventors, what is needed is a method and apparatus for portably producing lift gas that allows for both the relatively inexpensive production of lift gas and the capacity to produce lift gas at remote sites. In addition, there is a need in the art for producing lift gas on-board balloon flights to extend duration of flight time.

It is against this background that various embodiments of the present invention were developed.

BRIEF SUMMARY OF THE INVENTION

In light of the above and according to one broad aspect of one embodiment of the present invention, disclosed herein is a method for generating and using lift gas, e.g., hydrogen-rich gas mixtures, for facilitating the buoyancy of a balloon, and in particular a high-altitude balloon. Preferred embodiments of the present invention include generating and using hydrogen-rich gas mixtures for launching balloons and in particular launching balloons from remote locations, and/or for extending the duration of balloon flights and in particular extending the duration of high-altitude balloon flights.

In one example, the methods of the invention include reforming or reacting a fuel or other hydrocarbon source with water to generate hydrogen—carbon dioxide rich "lift gas" mixtures and using the lift gas for buoyancy in a balloon. The fuel or hydrocarbon sources used for generation of lift gas include, but are not limited to, alcohols, olefins, paraffins, ethers, aromatic hydrocarbons, and the like. In addition, the fuel sources can be from refined commercial products such as propane, diesel fuels, gasolines or unrefined commercial products such as crude oil or natural gas. The water can be introduced into the reforming reactor as liquid water, as steam, or, if the fuel is an alcohol or other substance miscible in water, as a component premixed with the fuel.

The reforming reaction can be driven by the release of energy from combustion or a non-combustion source such as electricity. In preferred embodiments the energy is provided by a combustion reaction using a combustible material, and atmospheric air.

In preferred embodiments the lift gas is a hydrogen—carbon dioxide rich gas mixture.

The method may also include the addition of a catalyst to the reforming reaction. The catalyst reduces the temperature required to reform the fuel source and improves selectivity of hydrogen and carbon dioxide production.

According to another broad aspect of another embodiment of the present invention, disclosed herein is an apparatus or device for producing lift gas useful in providing lift or buoyancy to a balloon. In one example, the apparatus may include a first storage container for storing a combustible material used in the combustion reaction; a second storage container for storing a fuel or alternative hydrocarbon source used in the reforming reaction; a third storage container for water to be reacted with fuel in the reformer; a first chamber having an inlet and an outlet, the first chamber for combusting the combustible material with ambient air for the release of energy, the inlet of the first chamber fluidly coupled with the first storage container; and a second chamber having an inlet and an outlet, the inlet of the second chamber fluidly coupled with the second and third storage containers, a portion of the second chamber positioned within a portion of the first chamber, the second chamber fluidly isolated from the first chamber. In one example, the energy released in the first chamber heats the fuel and water sources used in the reforming reaction in the second chamber to a temperature above that necessary for the reforming reaction thereby reforming the fuel and water sources into lift gas exiting the outlet of the second chamber and into a balloon or other container for capturing the lift gas.

In one example, the first chamber includes an igniter for igniting the combustible material, and the second storage container may include a mixture of water with the reforming reaction fuel source. The second chamber may be adapted to receive a catalyst to reduce the temperature and amount of energy required to heat the reforming reaction fuel and water sources to a temperature above that necessary for the reforming reaction to proceed.

In another embodiment, the apparatus may include a first heat exchanger coupled with the outlet of the first chamber and thermodynamically coupled with the second chamber, the first heat exchanger for pre-heating the reforming reaction fuel and/or water sources. The apparatus may also include a second heat exchanger coupled with the outlet of the second chamber and thermodynamically coupled with the inlet of the second chamber, the second heat exchanger for pre-heating the reforming reaction fuel and or water sources and for cooling the generated lift gas.

According to another broad aspect of another embodiment of the present invention, disclosed herein is an autothermal apparatus for generating lift gas for providing buoyancy to a balloon and in particular to a high-altitude balloon. In one example, the apparatus may include a single reaction chamber for combining a reforming fuel source, water, and an oxidizer; a reforming reaction fuel delivery pipe for delivery of the reforming fuel source; another pipeline for water; an oxidizing agent delivery pipe for delivery of oxygen or other like oxidizing agent; and a lift gas outlet port for removal of lift gas produced in the reaction chamber. In one example, a counter-flow heat exchanger provides energy/heat from the released lift gas to the incoming reformer fuel to facilitate the autothermal reformer reaction in the reaction chamber.

In one example of the autothermal reformer apparatus, a reaction chamber heater pre-heats the reaction chamber to initiate the reforming reaction and subsequent formation of lift gas. In another example, the reaction chamber includes a catalyst bed to facilitate autothermal reforming of appropriate reforming fuel sources.

According to another broad aspect of another embodiment of the present invention, disclosed herein is a portable balloon launch unit for generating the required lift gas to launch a balloon, and preferably a high-altitude balloon. Balloon launch units of the present invention include the reformer apparatus of the invention, the reformer apparatus being portable. Typical balloon launch units of the invention have size dimensions of approximately 1 $m^3$ and weight less than 60 kg. In some embodiments the size dimensions are approximately 0.5 $m^3$ and weigh as little as 20 kg. Other dimensions can be used in this regard (larger size dimensions or heavier equipment), but size and weight are minimized where the balloon launch is required at a remote location.

The features, utilities and advantages of the various embodiments of the invention will be apparent from the following more particular description of embodiments of the invention as illustrated in the accompanying drawings.

DETAILED DESCRIPTION OF THE INVENTION

Figure 1:
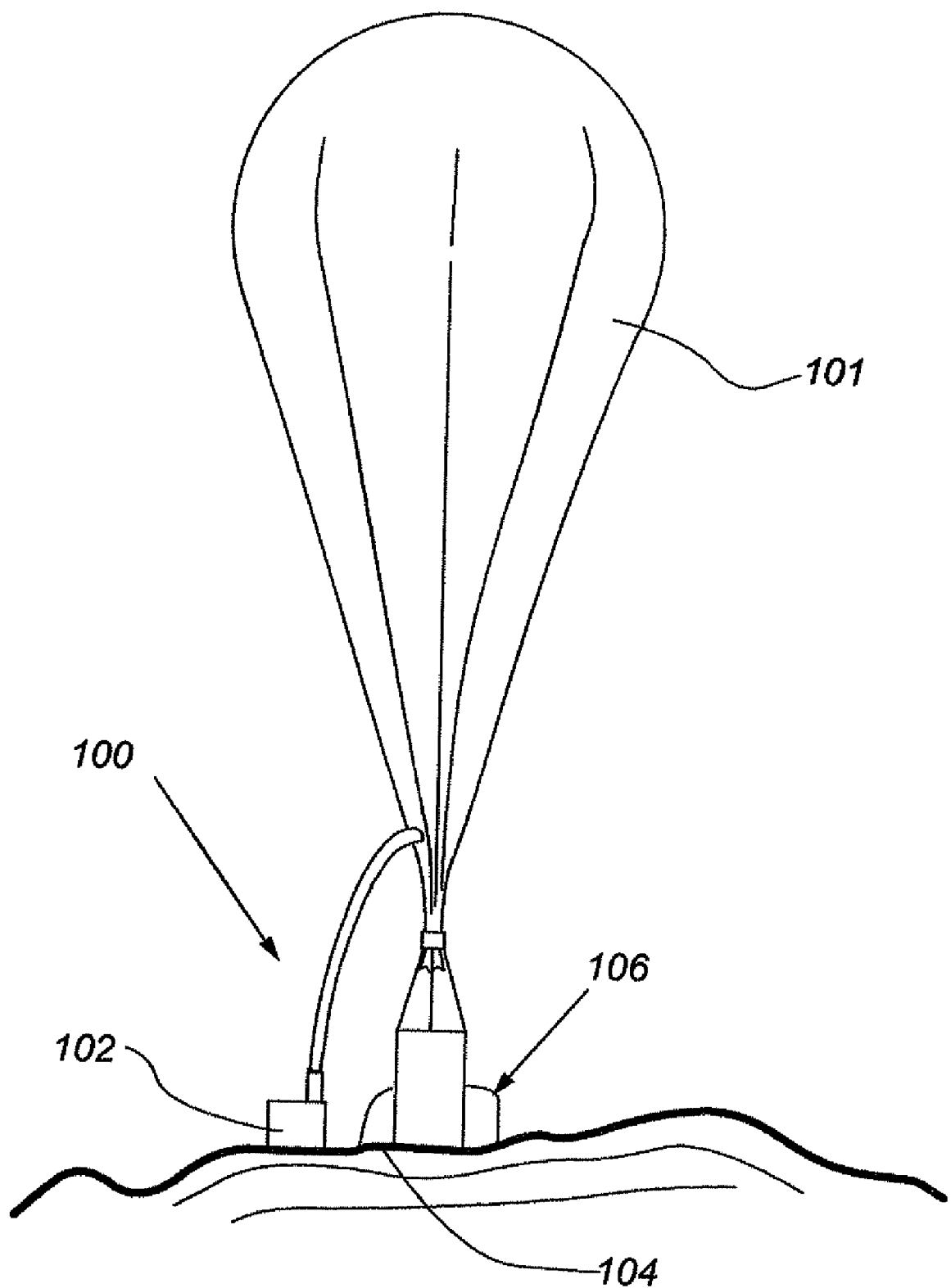
FIG. 1 illustrates an example of an embodiment of the present invention for producing lift gas useful in launching a high-altitude balloon.

Embodiments of the present invention provide for the creation of lift gas which is used for providing buoyancy to balloons, and in preferred embodiments providing buoyancy to high-altitude balloons. In some embodiments the buoyancy provided by the lift gas is used to launch balloons and preferably to launch balloons from remote locations. In these embodiments the lift gas can be generated by an apparatus located either on- or off-board the balloon. In other embodiments, the buoyancy provided by the lift gas is generated on-board the balloon and is used to extend the duration of the balloon's flight.

For purposes of the present invention lift gas is typically any gas formed during the reforming reactions of the present invention (see below) and is preferably a hydrogen-rich gas or hydrogen and carbon dioxide containing gas. Various embodiments of the present invention are disclosed herein. Note that the majority of the disclosure is directed toward creating a lift gas that is ultimately used for buoyancy in a balloon, however, methods and apparatus of the invention can also be used to create lift gases useful in providing lift to any object in need thereof.

For purposes of the present invention the term "buoyancy" refers to the upward pressure exerted upon an object by lift gas to provide lift to the object. In addition, the term "balloon" refers to any object designed to be inflated with gas that is lighter than the surrounding air causing the "balloon" to rise and float in the atmosphere. Balloons can include high-altitude balloons, weather balloons, blimps, airships, etc. Note that balloons typically include a flexible constraining material for capture of the lift gas. Further, the term "remote location" refers to geographic locations where traditional travel methods (airplane, ground transportation, etc) are either extremely difficult to accomplish or are extremely costly, for example, Arctic, Antarctic, various underdeveloped countries, mountain tops, deserts, other planets, etc. A remote location can also be a location on an offshore drilling platform, the deck of a ship, and other like man-made locations that would provide a difficult spot to move heavy and/or expensive equipment.

Embodiments of the present invention provide reformer apparatus for generating lift gas used in balloon launches or flight and in preferred embodiments lift gas used to launch balloons from remote locations and/or to extend the duration of high-altitude balloon flights. Apparatus embodiments of the invention are portable, self-contained and energy efficient, able to generate lift gas through reforming of a fuel source. Each apparatus utilizes a reforming reaction to generate the lift gas and a combustion reaction to provide the energy required to reform a fuel and generate the lift gas. Various apparatus embodiments are provided herein based on either separating the reforming reaction from the combustion reaction or based on combining the reforming reaction with the combustion reaction (referred to herein as autothermal reforming). In addition, the apparatus typically includes heat exchange elements to facilitate heat transfer from the high temperature lift gas to incoming reformer and/or combustion fuel. The transfer of heat facilitating the reforming reaction and lowering the energy required to complete the lift gas formation. Note that various apparatus configurations are envisioned to be within the scope of the present invention as long as the apparatus provides for on-site, portable, energy efficient reforming reactions (and preferably steam reforming reactions) that produce lift gas useful in the buoyancy of a balloon or other like object.

Balloon Launch

In FIG. 1, a launch unit 100 having a high-altitude balloon 101 is illustrated, the unit includes a portable, self-contained reformer 102 in accordance with the present invention. The self-contained reformer 102 generates lift gas for buoyancy in a balloon 101 or other like object, e.g., aerostats, dirigibles, etc. Referring to FIG. 1, a balloon 101 or other like object is located on a launch site 104 having a portable reformer 102 of the invention. The reformer generates lift gas that enters the balloon. Various techniques can be used to constrain the balloon on the ground (see arrow 106) until the balloon is ready for launch. Note also that other devices can accompany the reformer at the balloon launch site, for example, a membrane for separating higher molecular weight gas components from lower molecular weight components of the lift gas (see below).

Balloon launch units 100 of the present invention are portable, having the capacity for transport on a standard vehicle, helicopter or airplane. For example, balloon launch units of the present invention typically include a self contained reformer with a size between 0.5 and 2 $m^3$ and weigh less than 60 kg.

In one embodiment, to perform a launch, the unit, together with its reformer apparatus, combustion fuel, water, and the balloon or other like object and its payload are brought to the launch site by truck, boat, helicopter, conventional balloon or other conveyance. In one embodiment, the reformer apparatus is then turned on, causing a fan (or other like device) to deliver air into the combustion chamber. Fuel is then fed into the combustion chamber and the air fuel mixture is ignited, heating the reformer reactor. Once the reformer reactor is brought to adequate temperature, fuel and water are fed into the apparatus, (see below) where they will react with each other in the presence of a catalyst to produce a hydrogen-rich lift gas mixture, which will also contain some carbon dioxide and possibly some carbon monoxide or methane as well. This gas mixture will be lighter than air, and can be fed into the balloon for direct use as lift gas. Alternatively, the unit's output can be sent through a gas separation membrane, pressure-swing adsorption system, or other device, to remove much of the non-hydrogen components, thereby reducing the lift gas's molecular weight further before being fed to the balloon. In either case, once a sufficient amount of gas has been generated to produce the desired amount of balloon buoyancy, the reformer apparatus is turned off. The balloon is then disconnected from the device, sealed, and launched together with its payload.

The advantage of this procedure compared to the current state of the art is that no heavy compressed gas cylinders need to be transported to the launch site. Instead, locally available fuel and water can be used to enable balloon launch. This feature would be advantageous for any launch system, but becomes especially so it we consider the logistics problems associated with transporting compressed gas cylinders to enable conventional balloon launches in remote or rugged areas, islands, underdeveloped countries, military theaters of action, etc.

Description of the reformer apparatus and chemical reactions useful in the present invention are provided below.

Balloon Flight

Figure 2:
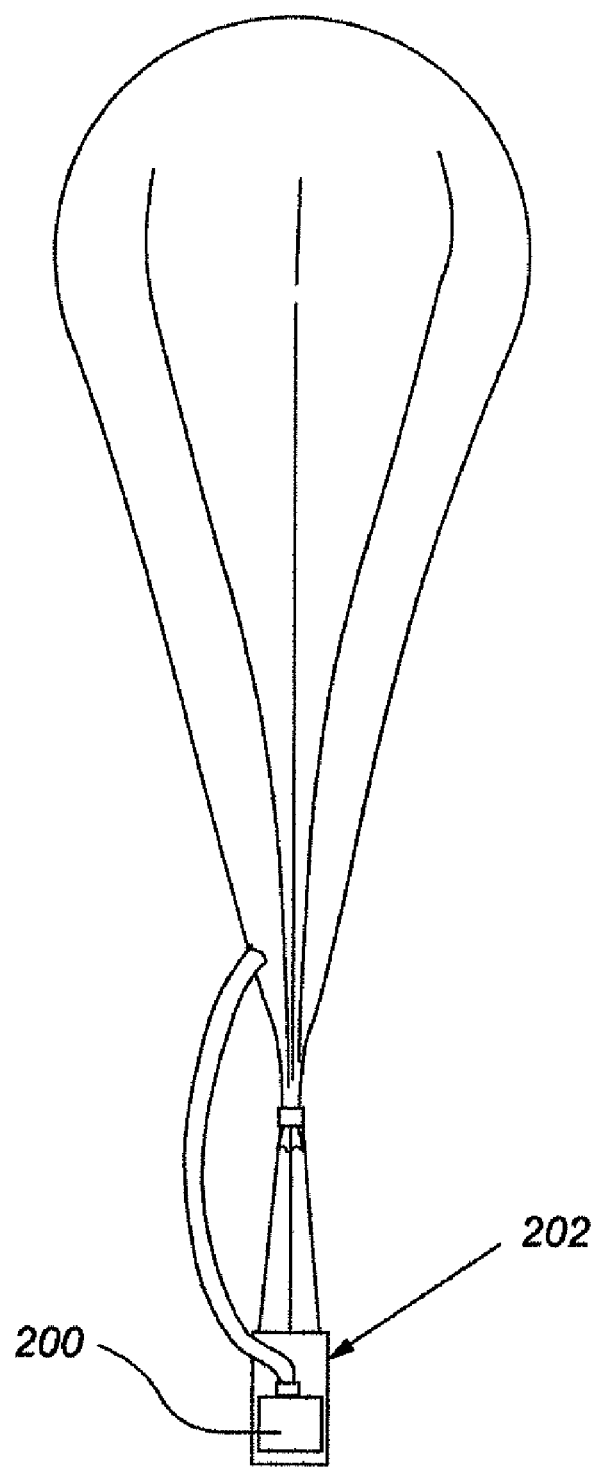
FIG. 2 illustrates an example of an embodiment of the present invention for producing lift gas useful on-board a high-altitude balloon to extend the flight time and/or expense of the balloon flight.

FIG. 2 illustrates an example of an embodiment of the present invention where a reformer apparatus 200 embodiment is on-board a balloon gondola 202 and useful in extending the duration of the balloon flight or allowing for the balloon flight on other terrestrial bodies.

Balloons 101 typically must vent gas in the daytime when heat from the sun makes the gas within the balloon expand. However, the loss of the gas during the daytime means that as the balloon cools (for example during the evening hours), the balloon no longer has enough gas or buoyancy to float. At this point the balloon must either drop ballast or take on more gas to continue flight at the same altitude as during the preceding day. The cycle must be performed the next day (temperature cycle) until the consumables required to release ballast/generate lift gas have been exhausted. At this point the flight must end.

Embodiments of the present invention diminish/overcome the above cyclical nature of balloon flight by providing the capacity to generate lift gas during flight and the capacity of generating ballast during flight.

Reformer reactor apparatus of the present invention generate lift gas when the temperature of the balloon falls to the point where the balloon begins to lose altitude. This typically occurs at nighttime when heat from the sun no longer impacts the balloon surface. The appropriate amount of lift gas can be generated using the reformer apparatus and appropriate fuel source when additional lift gas is required. This lift gas production reduces and/or eliminates the need to drop ballast during the evening. Note that the amount of lift gas generated during the nighttime is modified by the consumption of an amount of fuel source on board the balloon, i.e., weight of a fuel source consumed. In addition, rather than venting gas during the daytime, lift gas from the balloon can be reacted with air to produce water ballast (note that the $CO_2$ portion of the lift gas will not react with air and so is vented). The production of ballast limits the amount of gas that needs to be vented during the day (high temperature), because it makes the balloon heavier, the dropping of the ballast when the temperature decreases (nighttime) then reduces the amount of lift gas that needs to be produced. The net result of these benefits is a potential tripling of the flight time duration while using the devices of the present invention (over conventional ballooning technology).

In alternative embodiments, an auxiliary balloon (not shown) is provided along with a main buoyancy balloon, the auxiliary balloon captures and releases the lift gas generated using reformer embodiments of the present invention (see below). The auxiliary balloon can be used in combination with a main balloon that has the capacity to constrain the lift gas during the daytime (greatest amount of gas expansion) but is under-inflated during the nighttime. The auxiliary balloon would then be inflated during the nighttime to provide the additional lift required with the cooling of the gas.

Note also that the fuel source, water, combustibles, and other like materials are stored on the balloon as is well known in the art, for example, in a storage area on the gondola.

Reformer Apparatus

Figure 3:
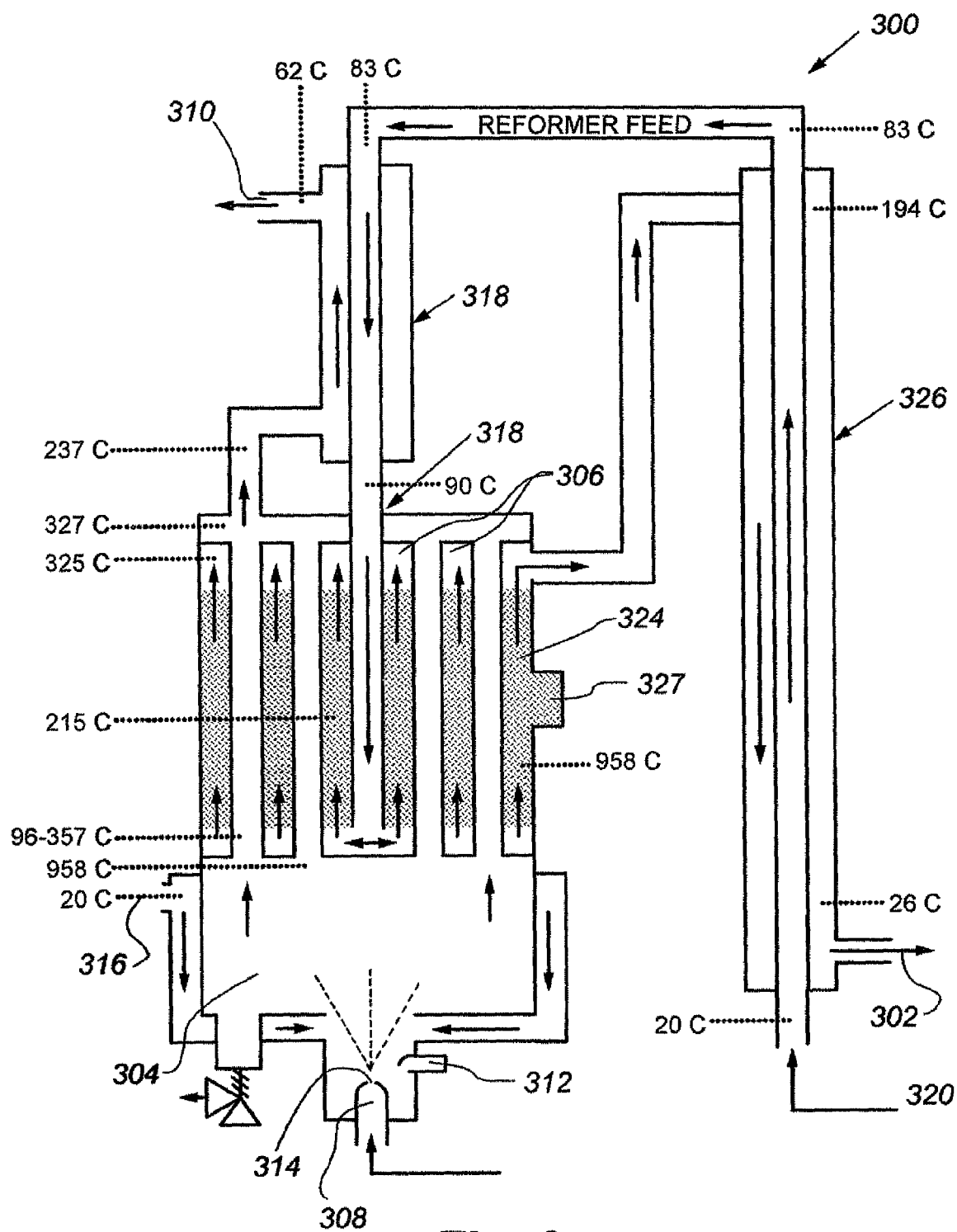
FIG. 3 illustrates an example of an apparatus for producing lift gas, in accordance with one embodiment of the present invention.
Figure 4:
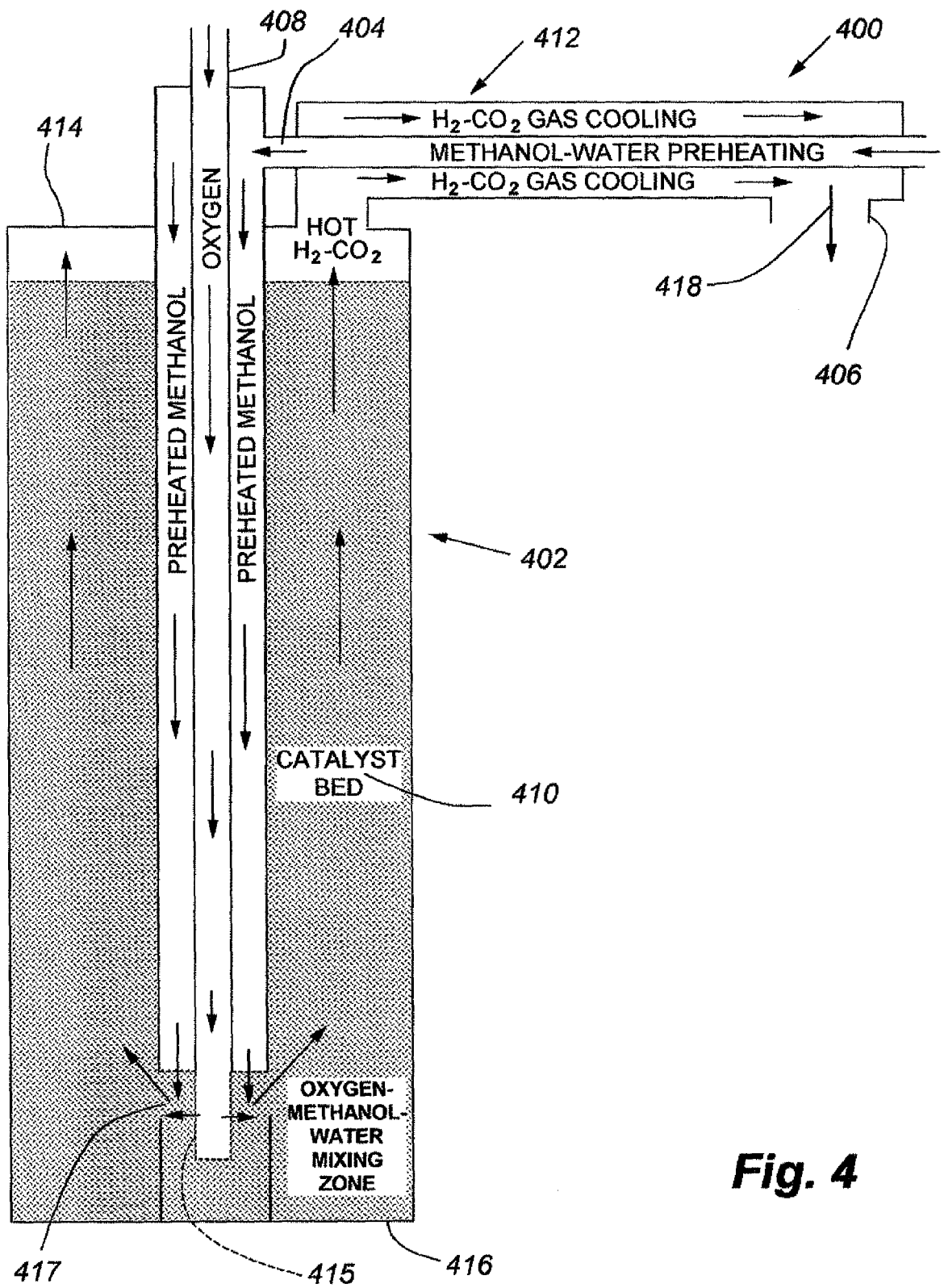
FIG. 4 illustrates another example of an apparatus for generating lift gas, in accordance with one embodiment of the present invention.

A first illustrative embodiment is described in FIG. 3 for separate reformer and combustion reactions, followed by an embodiment described in FIG. 4 for autothermal reforming and production of lift gas from a single reaction chamber.

FIG. 3 illustrates an example of a self-contained, portable apparatus 300 for generating lift gas (shown as arrow 302) for injection into a balloon, in accordance with one embodiment of the present invention.

In FIG. 3, an embodiment of the apparatus may include a first storage container (not shown) storing a combustible material, such as an alcohol or olefin. A second storage container (not shown) is also provided, which may include a reforming reaction fuel source, such as an alcohol, olefin, paraffin, and the like or mixtures thereof. If the reformer fuel is an alcohol or other chemical miscible in water, the water may be mixed with the fuel in this container. If the reformer fuel is a hydrocarbon such as a paraffin not miscible in water, a third container (not shown) is required for the water to be reacted with the fuel in the reformer chamber.

In one example, a first chamber 304 has an inlet port 308 and an outlet port 310 and is adapted to provide for the combustion of the combustible material. In one example, the first chamber includes an igniter such as a spark plug 312 or other conventional igniter, and a nozzle 314 coupled with the inlet port 308 of the first chamber 304. The inlet port 308 of the first chamber may be coupled with the first storage container so that the contents of the first storage container may be introduced into and combusted within the first chamber. The first chamber also includes a port 316 for introducing combustion air into the first chamber. The first chamber is also adapted to receive a portion of the second chamber 306, described below, so that the energy/heat from the combustion of the combustible material from the first storage container within the first chamber is transferred into a portion of the second chamber. The outlet port 310 of the first chamber, in one example, is near the inlet port of the second chamber (not shown), and a heat exchanger is used to allow the combustion exhaust gas to heat the fuel and water entering the second chamber. Alternatively, the outlet of the first chamber can feed to a heat exchanger 318 located inside the second chamber, which thereby allows the combustion exhaust gases produced in the first chamber to provide the heat to drive the reforming reactions in the second chamber.

The second chamber 306 has an inlet port (shown as arrow 320) and an outlet port 302. In one example, the inlet port is coupled with the second storage container 330 and receives the contents of the second and third storage containers. The second chamber may also include a port 322 for receiving catalyst material within the second chamber.

In one example, the second chamber is positioned within the first chamber, such that the combustion heat/energy from the first chamber heats the reforming reaction fuel and water sources contained within the second chamber to a point where the fuel source vaporizes and reforms into a lift gas which exists out of the outlet port of the second chamber. In one example, the first and second chambers are fluidly isolated.

A catalyst 324 may be utilized within the second chamber in order to reduce the temperature and amount of energy required to heat the reforming reaction fuel and water sources to their reaction temperature, and such catalysts are dependent upon the fuel source but include iron based catalyst, zinc oxide, copper based catalyst, nickel, ruthenium on alumina, and the like.

In one example, a first heat exchanger 318 is coupled with the outlet port of the first chamber (the combustion chamber) and is thermodynamically coupled with a portion of the inlet port of the second chamber. In this manner, the hot combustion exhaust gases from the first chamber are used to preheat the reforming reaction fuel and or water sources as they are being introduced into the second chamber for vaporization/ reformation into a lift gas.

A second heat exchanger 326 may also be utilized, wherein the second heat exchanger 326 is thermodynamically coupled with the outlet ports 302 and the inlet port 320 of the second chamber, which provides the dual benefit of preheating the reforming reaction fuel and/or water sources prior to entry into the second chamber, as well as cooling the lift gas which is expelled from the outlet ports of the second chamber. Note that various illustrative temperatures are shown to illustrate heat-exchange, but are not meant to limit the range of temperatures useful in the present invention.

FIG. 4 illustrates another example of a self-contained portable apparatus 400 for generating lift gas for providing buoyancy to a balloon or other like device, in accordance with another embodiment of the present invention. The embodiment illustrated in FIG. 4 provides what the inventors term an "autothermal reformer" for the production of lift gas useful in providing buoyancy to a balloon.

An autothermal reformer 400 of the present invention directly reacts a reformer fuel source with oxygen or other like oxidizers in a single chamber 402. Embodiments of the reformer provide an environment for reforming a fuel source with a feed at proper temperature and pressure resulting in the release of lift gas. Since the reforming reaction is favored by low pressure, in preferred embodiments pressure in the autothermal reactor should be kept under 50 bar. Embodiments of the autothermal reformer may combine counter-flow heat exchange elements to enhance heat transfer and energy efficiency of the autothermal reformer.

FIG. 4 shows one embodiment of the autothermal reformer apparatus 400 of the invention. Note that other autothermal reformer apparatus are envisioned to be within the scope of the present invention as long as they provide at least a reaction chamber with a reforming reaction fuel source inlet, an air or oxidizing agent inlet and a lift gas outlet.

Referring to FIG. 4, an autothermal reformer apparatus 400 is shown having a reaction chamber 402, a reforming reaction fuel delivery pipe (fuel pipe) 404 for delivery of a reforming reaction fuel, a lift gas outlet port (outlet port) 406 for release of produced lift gas, and an oxygen or other like gas inlet pipe (gas pipe) 408 for delivery of a gas used in the combustion of the reforming reaction fuel in the reaction chamber.

Still referring to FIG. 4, the reaction chamber 402 is of sufficient size and shape for autothermal reforming of a fuel source. Different chamber geometries can be used as long as they constrain the autothermal reforming reactions of the present invention and provide sufficient chamber space to produce an amount of lift gas necessary at a balloon launch site or on-board an in-flight balloon. A catalyst bed (see below) 410 is typically integrated into the reaction chamber for optimized autothermal reforming reactions. In the embodiment shown in FIG. 4, the fuel pipe 404 is coupled to the outlet port to form a counter-flow heat exchanger 412 so that the energy/heat from the exiting lift gas is transferred to the reforming fuel entering the reaction chamber via the fuel pipe. In addition, the fuel pipe 404 typically enters at a first (or, in this case, top) end 414 of the reaction chamber and releases the fuel toward the second (or, in this case, bottom) end 416 of the reaction chamber. This configuration enhances heat release from the heated reformer fuel into the contents of the reaction chamber. Release of fuel into the chamber 402 can be via a nozzle 415 or other like device. The gas pipe 408 is typically coupled to or adjacent to the fuel pipe and releases the oxygen or other like gas adjacent to the release of the reformer fuel 417. Note that other configurations of reformer fuel and water delivery, oxygen or other oxidizing agent delivery and lift gas release are envisioned to be within the scope of the invention and are shown in FIG. 4 as an illustration of one embodiment.

In use, the reaction chamber of the autothermal reformer apparatus is typically preheated to a temperature sufficient to start the reforming reaction, i.e., between 200° C.–400° C. Preheating can be accomplished by a reaction chamber integrated heating element, a heating coil, an external combustor heating system, or other like device (not shown).

The reformer fuel source (with or without water, see below) is fed into the reaction chamber via the fuel pipe 404. Note that once lift gas is produced in the reaction chamber, the reformer fuel is heated prior to delivery into the reaction chamber by the exiting lift gas (shown as arrow 418) via the counter-flow heat exchanger. At approximately the same time that the reformer fuel is being delivered to the reaction chamber, the oxygen or other oxidizing agent being delivered to the reaction chamber via the inlet pipe. Various reformer chemical reactions are described below.

Once the reforming reaction has been established within the reaction chamber the reaction chamber heating element may be shut off to conserve energy. Note also that the amount of water combined into the reforming fuel can be adjusted to control the reforming temperatures.

Chemical Processes

The generation of lift gas(es) will now be described, for example generating hydrogen rich gas, i.e., a mixture of hydrogen gas ($H_2$), carbon monoxide (CO) and/or carbon dioxide ($CO_2$). The constituents of lift gas produced by embodiments of the present invention is determined by the reaction constituents and conditions as described below, but generally include at least hydrogen gas.

Embodiments of the present invention provide processes for producing lift gas from the reforming of select fuel sources, such as solid, liquid and/or gaseous hydrocarbons, alcohols, olefins, paraffins, ethers, and other like materials. Illustrative fuel sources for use in the reforming reaction include, but are not limited to, methanol, ethanol, propane, propylene, toluene and octane.

The combustor fuel can include both refined commercial products such as propane, diesel fuel, and/or gasoline, or unrefined substances such as crude oil, natural gas, coal, or wood. In preferred embodiments the lift gas mixture is generated from the steam reforming of fuels such as methanol or ethanol.

The methods of the invention are reproducible and easily performed in the portable inventive devices described herein. The processes of the invention are superior to electrolytic hydrogen generation which require large amounts of electrical power and are typically non-portable. The preferred processes of the invention are also superior to the production of hydrogen by cracking or pyrolyzation of hydrocarbons without the use of water because much more lift gas is produced for a given amount of fuel consumed.

The methods of the invention use easily obtained fuel sources such as a hydrocarbon sources, water, and atmospheric air.

Embodiments of the invention also include combustible materials to supply the energy to drive the reforming reactions of the present invention. Combustible reactions can include a source of energy that is burned with ambient air for the release of energy. Note that in alternative embodiments of the invention, the energy required to drive the reforming reactions of the invention can be provided by non-combustion sources, such as solar, nuclear, wind, grid electricity, or hydroelectric power.

In some embodiments of the invention, the reforming reaction to generate hydrogen rich gas and combustion reactions to drive that reaction both incorporate the same fuel.

For example, methanol can be used as the reforming fuel source and as the source of combustion to drive the reforming reaction.

In more detail, the invention provides reforming processes of any reforming fuel source to generate, for example, $H_2$, CO and/or $CO_2$. The lift gas forming reactions of the invention are endothermic, requiring an input of energy to drive the reaction toward fuel reformation.

In one embodiment, the energy required to drive the reforming reaction is provided through the combustion of any combustible material, for example an alcohol, a refined petroleum product, crude petroleum, natural gas, wood, or coal that provides the necessary heat to drive the endothermic steam reforming reaction.

In another embodiment, the energy required to drive the reforming reaction is provided via any non-combustible source sufficient to generate enough heat to drive the reforming reaction to substantial completion.

The present combination of reforming and combustion reactions can be performed within a portable reaction vessel, for example the devices described herein (see FIG. 3 and FIG. 4). This is in contrast to electrolysis hydrogen gas formation which requires large amounts of electrical power and non-portable machinery for the generation of the gas.

The following reactions provide illustrative processes for reforming a fuel source to produce a lift gas used in providing buoyancy to a balloon or other like object. Several illustrative combustion reactions that provide the energy required to drive those reforming reactions are also provided. In one embodiment, provided as Reaction 1, a hydrogen rich gas is formed using pure methanol. Note that the reforming reaction and combustion reaction can be performed in separate reaction chambers (see FIG. 3) or can be combined and performed in a single reaction chamber (see FIG. 4). The following 12 reactions illustrate a separation of the reforming and combustion reactions, however, as is shown in FIG. 4 and discussed in greater detail below, an autothermal reforming reaction can be accomplished by directly reacting the fuel sources of the invention with oxygen in a single reaction chamber. These autothermal reactions can be performed in the presence or absence of water.

Separate chamber reactions (see FIG. 3):

$$CH_3OH \rightarrow CO + 2H_2 \qquad \text{Reaction 1:}$$

Reaction 1 comes with an ΔH of +128.6 kJoules/mole. This means that this same amount of energy must be contributed by the combustion reaction to drive the reaction toward the formation of CO and $H_2$.

In an alternative embodiment, the reformed fuel, e.g., methanol, can be mixed with water as shown in reaction 2:

$$CH_3OH + H_2O \rightarrow CO_2 + 3H_2 \qquad \text{Reaction 2:}$$

Reaction 2 comes with an ΔH of +131.4 kJoules/mole. As above in Reaction 1, for a small price in energy, an appropriate fuel source can be cracked to form hydrogen gas, carbon monoxide and/or carbon dioxide. If we compare Reaction 2 to Reaction 1, we observe that for essentially the same energy, the use of water allows the hydrogen yield to be increased by 50%. This is why it is generally advantageous to employ both water and fuel in the proposed reforming system.

Reactions 3-8 illustrate several other reforming reaction fuel reactions that are in accordance with the present invention.

$$C_2H_5OH + 3H_2O \rightarrow 2CO_2 + 6H_2 \qquad \text{Reaction 3 (ethanol):}$$

$$C_3H_8 + 6H_2O \rightarrow 3CO_2 + 10H_2 \qquad \text{Reaction 4 (propane):}$$

$$C_3H_6 + 6H_2O \rightarrow 3CO_2 + 9H_2 \qquad \text{Reaction 5 (propylene):}$$

$$C_7H_8 + 14H_2O \rightarrow 7CO_2 + 18H_2 \qquad \text{Reaction 6 (toluene):}$$

$$C_8H_{18} + 16H_2O \rightarrow 8CO_2 + 25H_2 \qquad \text{Reaction 7 (octane):}$$

$$CH_4 + 2H_2O \rightarrow CO_2 + 4H_2 \qquad \text{Reaction 8 (methane):}$$

Note that in general Reactions 1-8 (as well as other reforming reactions of the invention) result in large increases in the number of molecules of products compared to reactants, so all are benefited by being performed under low pressure.

In alternative embodiments the reforming reaction is performed in the presence of a catalyst, for example, when the reforming reaction fuel is an alcohol, e.g., methanol or ethanol, which is combined with water, the feed is passed over a copper on alumina, copper on zinc oxide, or other copper-based catalyst at temperatures above 250° C. (although better results may be obtained at higher temperatures). Thus, for example, the reactor chamber in FIG. 4 could be prepared with a copper on zinc oxide catalyst when the reformer fuel is an alcohol.

When the reforming reaction fuel is a hydrocarbon, e.g., paraffins, olefins, aromatics, combined with water, the feed is passed over an iron based catalyst at temperatures above 300° C. (although better results may be obtained at higher temperatures).

When the reforming reaction fuel is methane combined with water, the feed is passed over a nickel or ruthenium based catalyst at temperatures above 500° C. (although better results may be obtained at higher temperatures).

These are examples; other catalyst types may also be effective for enhancing the described reforming reactions.

In some embodiments, combinations of olefins, paraffins, and aromatics (as found in crude petroleum) can be used as the reforming reaction fuel source. In other embodiments, a crude petroleum product is used as the reforming reaction fuel source where the crude petroleum product is first treated to remove sulfur or other impurities (sulfur can poison catalyst involved with the reforming reaction). Note that other reforming reaction fuel sources may also need to be pretreated for removal or sulfur or other impurities, for example, natural gas.

In another embodiment of the invention, a reforming reaction fuel source can be generated from a pre-source. In one example, gamma alumina is used to react dimethyl ether with water to make methanol via Reaction 9:

$$(CH_3)_2O + H_2O \rightarrow 2CH_3OH \quad \text{Reaction 9:}$$

The methanol produced in Reaction 9 can then be reacted with more water via Reaction 2 to produce the lift gas. As such, using a mixed gamma alumina and copper catalyst bed, dimethyl ether and water are reacted to obtain the net result shown in Reaction 10:

$$(CH_3)_2O + 3H_2O \rightarrow 2CO_2 + 6H_2 \quad \text{Reaction 10:}$$

The energy required to drive the reforming reactions is provided by either combustible or non-combustible sources. In preferred reactions the energy is provided by combustion of a combustible material and in some embodiments the combustible material is the same as the reforming reaction fuel source.

An illustrative combustion reaction is shown in Reaction 11. The combustion of a source of fuel supplies the energy to drive reactions 1-10. An illustrative example is the combustion of methanol with ambient oxygen to release $\Delta H$ of $-725.7$ kJoules/mole. Reaction 11 is shown below:

$$CH_3OH_{(e)} + 3/2 O_2 \rightarrow CO_2 + 2H_2O \quad \text{Reaction 11:}$$

Thus, theoretically (not being bound by any particular theory) for purposes of this illustration, only ⅓ of the mass of methanol is required to be burned to reform methanol via reactions 1 and/or 2. This is a small price to pay given that most fuels used in the reforming reaction are cheap, easy to store as a liquid and readily available, even in remote areas of the world.

In general, the required energy to drive the reforming reactions of the present invention can be furnished by burning small fractions of the reforming reaction fuel source or by using an alternative fuel or other heating methods such as nuclear, solar or electric grid power. In each case, a much larger number of product molecules is produced than is burned or reacted, allowing a large quantity of lift gas to be produced at low cost.

In yet another embodiment, carbon monoxide derived from various reforming reactions is separated away from the hydrogen gas using a "membrane" or other separation device and further burned to provide additional energy to drive the methanol reforming, see Reaction 12.

$$CO + \frac{1}{2}O_2 \rightarrow CO_2 \quad \text{Reaction 12:}$$

The burning of CO results in the $\Delta H$ of $-283.0$ kJoules/mole, again releasing heat for use in driving the reforming reactions illustrated in Reactions 1-10. It should be noted that by removing the CO, the molecular weight of the lift gas can be reduced from about 11 to as little as 2 (i.e. the lift gas can be made into pure, or nearly pure, hydrogen), which may be very advantageous for balloon applications.

With regard to autothermal reforming, a reforming fuel is directly reacted with oxygen in the presence or absence of water. In alternative embodiments to facilitate combustion of all of the reforming fuel, oxygen gas, air, or alternative oxidizer materials, e.g., hydrogen peroxide, nitrous oxide, is metered in an amount to react with all of the carbon contained in the reforming fuel. The thermodynamics of the autothermal chemical reactions and the presence of a proper catalyst with proper selection of operating temperature and pressure result in formation of substantially only carbon dioxide and hydrogen gas. However, in use, small amounts of water and other compounds may form by combustion of hydrogen or other byproduct reactions. Where air is used as the oxidizer, there will also be nitrogen left over which can serve as part of the lift gas, or be removed through the use of a membrane.

A membrane separator, pressure-swing adsorption, or other methods may also be used in lift gas generators using reactions such as reactions (2)-(9) and thus produce a mixture of $CO_2$ and hydrogen. In these cases, removal of the $CO_2$ from the lift gas mixture can reduce its molecular weight from 12.5 to as little as 2.

These uses compare with the use of helium or other stored compressed gases as lift gas at a balloon launch site. However, such gases are normally transported at very high pressures (2200 psi) and in very heavy gas bottles (e.g. K-bottles, ~55 kg each with, for example, 1.1 kg of He). Using easily transported methanol to perform Reaction(1) or (2), or other available reformer fuels, allows the on-site production of a high-hydrogen-concentration gas without a large electrical requirement needed for electrolytic gas generators. In this sense, gas generation for use in the field provides a significant cost benefit over conventional methods for transporting generating a lighter than air gas.

Process embodiments of the invention can take place as a reforming reaction between 200 and 400° C., dependent on the fuel source and catalyst, and more preferably at about 400° C. As such, the reforming feed, i.e., fuel and water sources, are heated to boiling temperature, vaporized, then continued to be heated to the above temperature range, where they react to form lift gas. After the reforming reaction, the gas product can be cooled. The heat is provided by combustion of a fuel or via a non-combustible source.

With regard to a combustible reaction to supply the energy to drive the reforming reaction, a spark plug, incandescent wire, or any other common ignition device is typically used to initially start the reaction.

The following description is provided as an illustrative example and is not meant to limit the description herein.

Step 1: Preheat Reformer Feed, Cooling of Gas

The reformer feed (fuel and water) enters the system at 20° C. Use of methanol will be provided for illustrative purposes. The average boiling temperature for the $CH_3OH$ and $H_2O$ mixture is ~90° C. Assuming as an example a small system with a lift gas production rate of 100 standard liters per minute, the heat required to preheat the reformer feed from 20 to 90° C. is 202 J/s. The heat lost during this step is 4 J/s. The aim of this heat exchanger is to have the gas exit at about 35° C. Knowing the preheat will require a total of 206 J/s, the inlet temperature of the hydrogen rich gas needed is calculated to be 130° C. A heat exchanger model shows that a total length of 2.6 m of tube-in-tube exchanger is needed. Coiled, the resulting height is about 9 cm.

Step 2: Begin Boiling Reformer Feed, Begin Cooling Gas

The hydrogen rich gas will be leaving the reaction chamber at about 400° C. As it cools to 130° C., a heat of 613 J/s is produced, 16.5 J/s of which is lost. To vaporize the $CH_3OH$ and $H_2O$, 1308 J/s is needed. Therefore, the gas partially boils the reformer feed. The total length of the tube-in-tube required for this process is 2.1 m. When coiled, the resulting height is about 7 cm. The heat exchangers for steps 1 and 2 are combined into a single unit.

Step 3: Finish Boiling Reformer Feed, Cool the Combustion Gas

After Step 2, the reforming feed still needs 710 J/s to finish vaporizing, and in this step, 42 J/s is lost. As calculated in Step 5, the combustion gas will leave the reformer at about 648° C. Giving the reforming feed the heat it needs to boil brings the combustion gas temperature down to 127° C. This takes a length of 2.8 m of the tube-in-tube exchanger, which is about 10 cm high when coiled.

Step 4: Finish Heating Reformer Feed

The reforming feed is already vaporized and will finish heating when it contacts the top plate of a combustion chamber. Heating the reforming feed from 90° to 400° C. requires 518 J/s. This amount of heat brings the temperature of the combustion gas from 1650° to 1360° C.

Step 5: Reforming Reaction

To reform $CH_3OH$ and $H_2O$, 1080 J/s of power may be used in this example. This section of the heat exchanger also loses 94 J/s to the surroundings. Accommodating this, the combustion gas temperature drops from 1360 to 648° C. The design length of this multiple tube section is about 20 cm.

An equation for determining the heat used or needed for these processes is $Q=\Sigma mC_p\Delta T$. The calculations led to obtaining the $\Delta H$ and heat lost across a given section and the section's length. The heat exchange formulas and calculation methods used for the reformer system design are given in Incropera and DeWitt, 1996.

The following examples are provided by way of illustration and are not intended as limiting.

EXAMPLES

Example 1

Remote Balloon Launch

Embodiments of the present invention generate high quality lift gas using minimal consumables, e.g., methanol, water, air, air blower, etc. Compared to the electrolytic lift gas generator, i.e., water electrolysis, embodiments of the present invention are smaller, require less electrical power, require less fuel, have greater practical production rate, and are more reliable.

The reforming of methanol using device embodiments of the present invention to produce 100 standard liters per minute of lift gas requires less than 4 kilowatts of thermal power. An electrolytic hydrogen generator of this scale requires roughly 25 kilowatts of electrical power just for the electrolyzer, plus, in remote locations, a generator to support this level of electrical power production. The mass of such a system is estimated to be several thousand pounds. The overall power requirements combined with the inefficiencies of converting the fuel (gasoline, diesel, propane, etc) to electrical power via the generator result in huge consumable requirements relative to the embodiments of the invention described herein.

To reduce instantaneous power requirements and system mass, electrolytic generators need to gradually collect, compress, and store hydrogen for later delivery to a balloon in order to provide a reasonable fill rate. Conversely, embodiments of the present invention can substantially instantaneously generate the required rates and thus eliminate hydrogen compression and storage requirements. In addition, electrolytic generators require care to prevent damage to the electrolyzer cells. In remote locations where such a system might be desirable, the risk of damage due to contamination is greater. However, embodiments of the present invention are much less susceptible to damage from field operations since there are few moving parts and relatively few sensitive components (see FIGS. 3 and 4).

The following comparison is provided between one embodiment of the present invention and a conventional electrolytic generator:

TABLE 1

| Reformer Apparatus vs. Electrolytic Generator | | |
|---|---|---|
| Parameter | Present Invention | Electrolytic Generator |
| Mass, kg | <100 | >2,000 |
| Size, m$^2$ | <1 | >4 |
| Electrical Power, kw | <0.5 | ~100 (from generator) |
| Fuel, g per Std L lift gas | 0.1 | 1.4 |
| Methanol, g per Std L lift gas | 0.35 | 0 |
| Water, g per Std L lift gas | 0.2 | 0.8 |
| Cost, $ | <<10,000 | >>50,000 |

Table 1 shows that embodiments of the present invention have advantages over electrolytic generators in virtually every category. The comparison is based on the use of methanol as the present invention fuel source and diesel fuel as the electrolytic generator fuel source. The fuel and methanol rates for embodiments of the present invention are based on direct measurements for reforming of a 1:1 molar methanol:water mixture. The fuel rate for the electrolytic generator is based on 25 kW electrical power (assuming 85% electrolyzer efficiency) and 100 kW thermal power input to the diesel generator, i.e., 25% generator efficiency. Electrical power shown for the present invention is for an air blower (60 SLPM pumped from ambient pressure to 10 psig) and controls and instruments. Power requirements for the present invention are such that manual-powered generators or pumps could even be used to supply the needed air flow and electric power.

This example showed the utility of using embodiments of the present invention to generate lift gas in remote locations as compared to conventional electrolytic generators.

Example 2

Extension of Stratospheric Balloon Flight Duration

A mission analysis for a 40,000 m$^3$ zero pressure polyethylene balloon flight at an altitude of 100,000 feet is provided. The balloon is assumed to have a mass of 54.6 kg, scaled off of a Raven 4,000 m$^3$ balloon (which has a mass of 5.46 kg). It is also assumed the balloon in this example has a daytime temperature of about 245 K and a nighttime temperature of about 215 K. Five options are considered for purposes of this Example:

1. Ballaster: This is a helium balloon that compensates for the day/night cycle by dropping ballast.
2. Helium Makeup: This is a helium balloon that compensates for the day/night cycle by providing helium makeup gas from a high-pressure container. The container is assumed to have a mass of six times the helium it contains.
3. Apparatus of the Present Invention (makeup gas only): Embodiments assume a helium carrier balloon (40,000 m$^3$) with a 5,600 m$^3$ auxiliary balloon which is filled with makeup gas using the device embodiments described herein to compensate for the day/night cycle. The device of the present Example uses watered methanol to produce $CO_2/3H_2$ lift gas (based on the Raven 3,000 m$^3$ balloon, such a 5,600 m$^3$ balloon would have a mass of about 15 kg).
4. Apparatus of the Present Invention (Hydrogen Reactor): Embodiments assume a helium carrier balloon (40,000 m$^3$) with a 5,600 m$^3$ auxiliary balloon which is filled with makeup gas using the device embodiments described herein to compensate for the day/night cycle. However, when it comes time to vent the auxiliary balloon during the day, the lift gas is run through a catalytic reactor to react with hydrogen in the lift gas with air to produce water, which is retained as ballast. The water ballast is dropped the following night which reduces the amount of lift gas needed to be produced each night, thereby extending flight duration.
5. Apparatus of the Present Invention (Hydrogen Reactor and Water Recycle): Embodiments assume the same parameters as option 4 above, except that the balloon takes off with neat methanol, instead of watered methanol, and the water to react with methanol to make lift gas is provided by using a fraction (about ⅓) of the water produced by the hydrogen reactor. This increases the amount of lift gas that can be produced by a given amount of carried methanol by about 50%, thereby extending flight.

Figure 5:
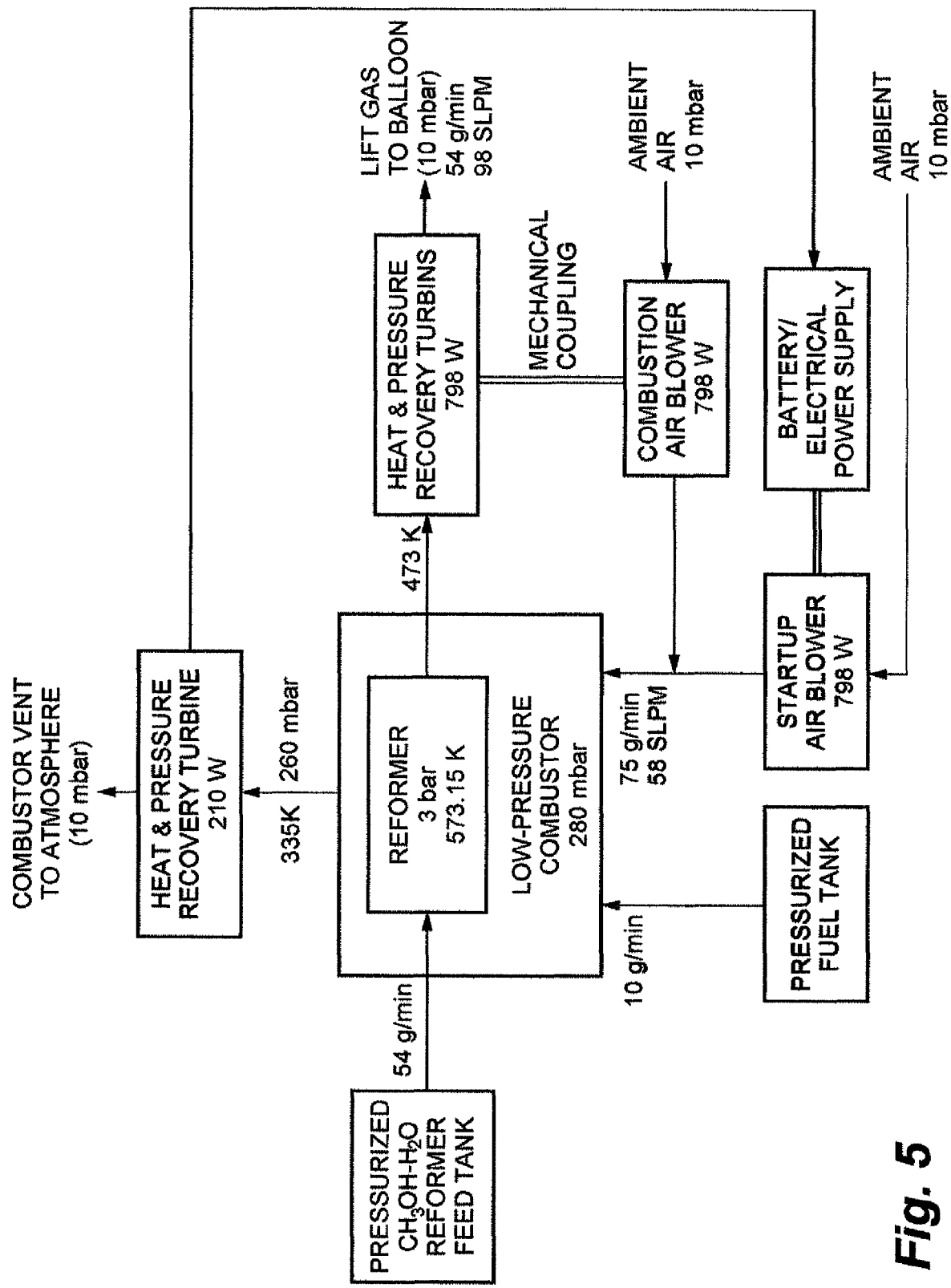
FIG. 5 illustrates an example of a system of an on-board reformer apparatus in accordance with the present invention.

For purposes of the present Example, embodiments of the devices are assumed to have a mass of 20 kg. Given its volume and float altitude, the flight system has a total floating mass of 668 kg. If we assume that the scientific payload gondola for each option has a mass of approximately 100 kg, we can calculate the initial consumable supply available to sustain flight, and the amounts of consumables used each day. The decline in the onboard consumable supply results in the flight being terminated. The following flight times are then obtained for each option:

Option 1 (Ballaster)—9 days
Option 2 (Helium Makeup)—6 days
Option 3 (Apparatus of the Present Invention (makeup gas only)—17 days
Option 4 (Apparatus of the Present Invention (Hydrogen Reactor))—25 days
Option 5 (Apparatus of the Present Invention (Hydrogen Reactor and Water Recycle))—35 days Power requirement evaluations were also performed using the options described above. As shown in FIG. 5, a system based on option 3 (assuming operation over approximately 4 hours) illustrates generation of lift gas for a nighttime lift. The analysis assumes a 1:1 methanol:water reformer feed and a pure methanol fuel for the combustor. FIG. 5 shows that the system can be operated with no auxiliary power beyond the induced direct drive turbine and a small electrical generator/battery using power from the embodiment detailed in option 3.

Turbine efficiencies are included in the net power delivery requirements shown. In the system of FIG. 5, the turbine operating on the lift gas directly drives the combustion air pump. A small amount of stored power is used for the start up combustion air blower. The air blower is operated for only a few minutes until the lift gas is generated to drive the lift gas turbine. The combustion exhaust turbine charges this battery for the next operation cycle. The liquid feed and reformer feed are delivered via a simple pre-charged gas overpressure system requiring no power input other than the control valves.

Figure 6:
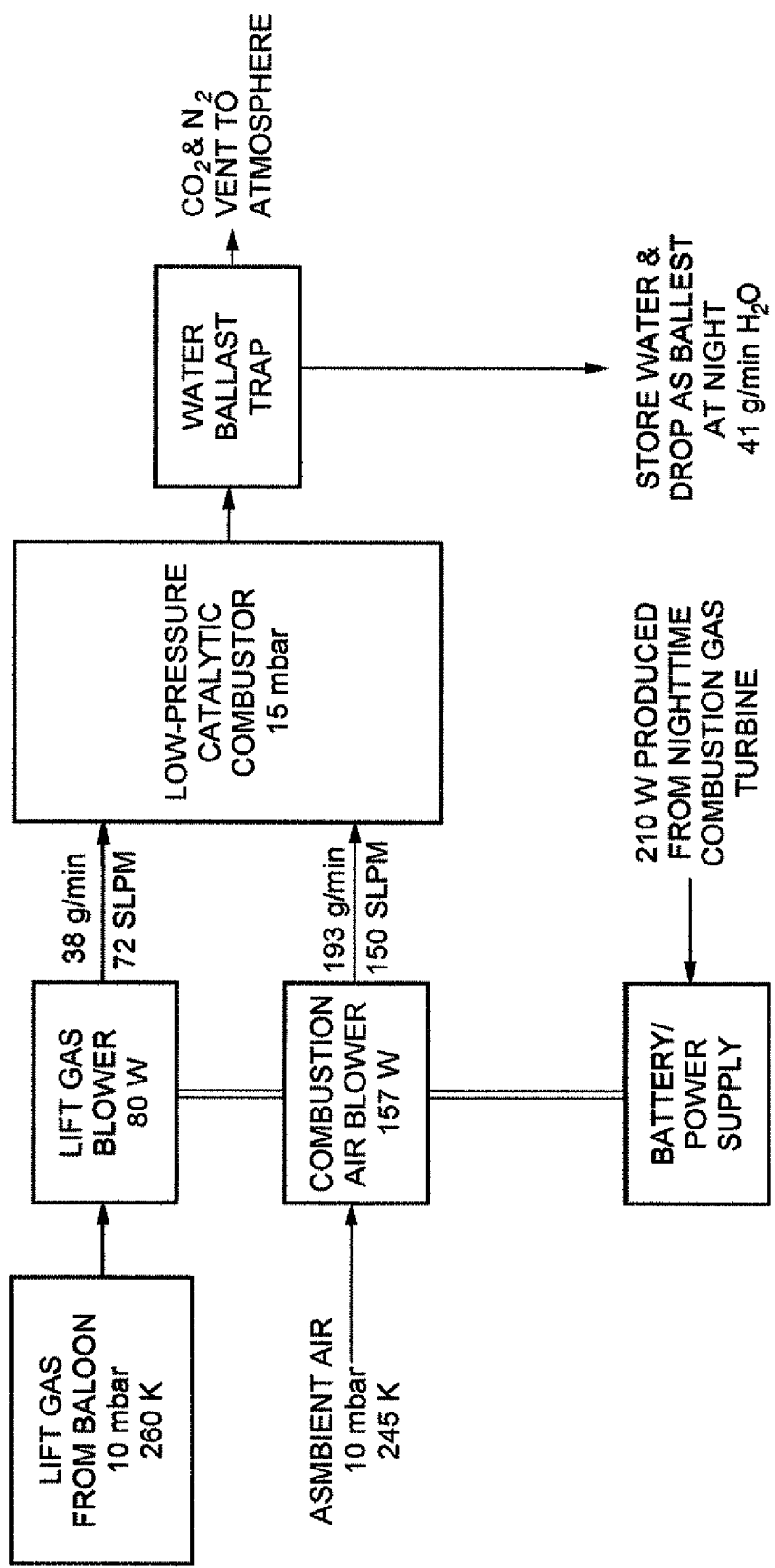
FIG. 6 illustrates an example of a system useful in day operation of an on-board water ballast generator in accordance with the present invention.

FIG. 6 illustrates a schematic for daytime operation of the device described in option 4 above. This system would operate for as short as a few hours each day. FIG. 6 shows the high sensitivity of power requirements to operating pressure (for the air blowers). A key feature of this embodiment is that the liquids can be delivered under pressure with little or no electrical power to produce considerable power in the gas phase.

As such, this Example shows the utility of the present invention.

Example 3

Water Ballast Production from Lift Gas Combustion

The following Example was performed to illustrate the utility of producing lift gas during the day and generating ballast in the form of water for release in the evening. In addition, the water collected from combustion can also be recycled to the reformer at night, thereby reducing the amount of water required at launch of the balloon.

Thermodynamic evaluation of hydrogen combustion with air over a wide range of temperatures and pressures, including near-vacuum conditions, indicated virtually complete conversion. For example, at only 10 millibar and 600 K, the equilibrium hydrogen mole fraction is only $4 \times 10^{-9}$ after combustion in air.

Figure 7:
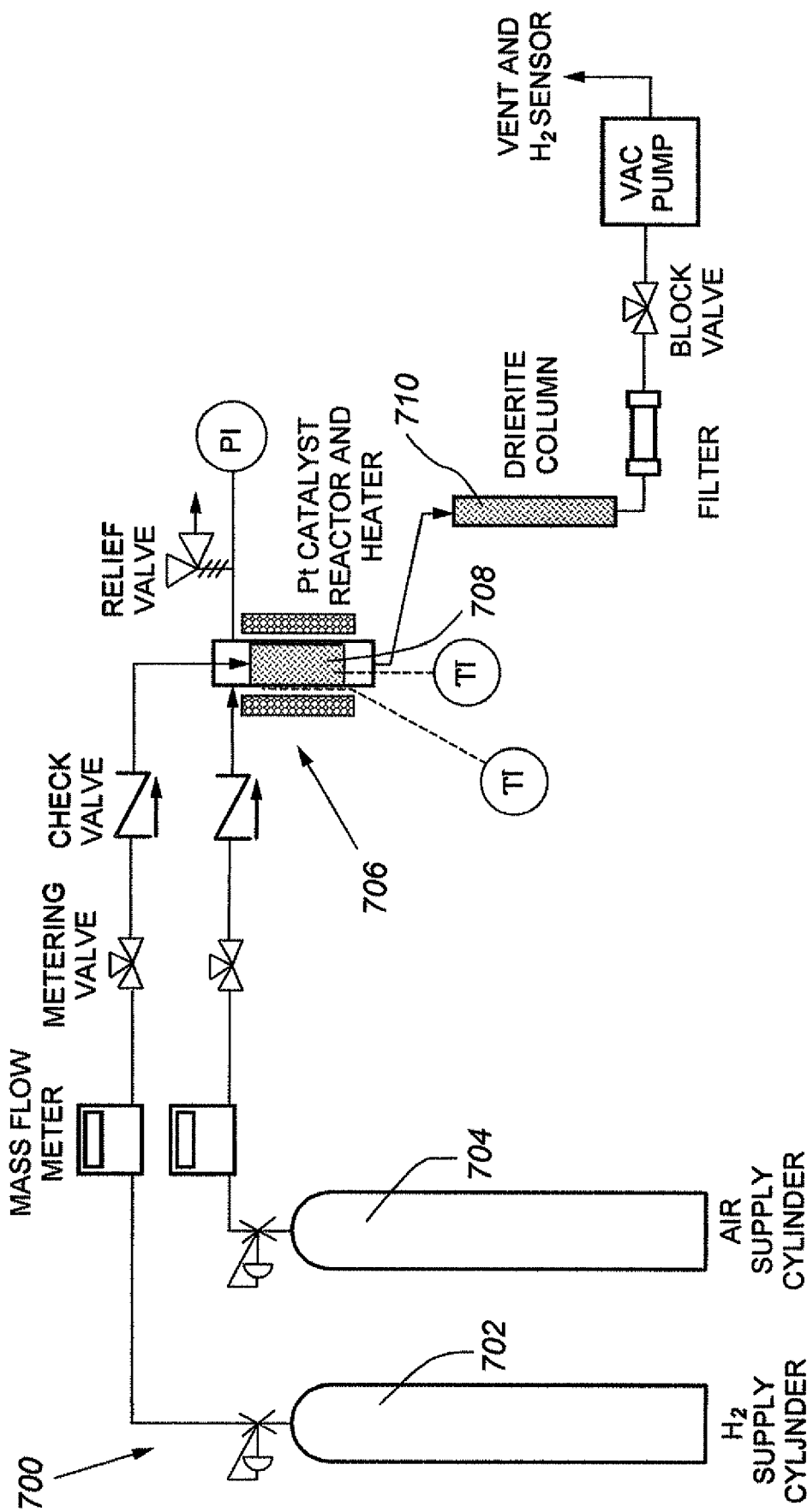
FIG. 7 illustrates an experiment demonstrating low-pressure hydrogen combustion in accordance with embodiments of the present invention.

Based on thermodynamic results, FIG. 7 shows a diagram of a device 700 used in testing the feasibility of burning hydrogen at very low pressure over a catalyst. Hydrogen 702 and air 704 were fed to a reactor 706 containing a platinum catalyst (Aldrich 20,601-6; 0.5% wt % Pt on $Al_2O_3$ mm pellets) 708. A hydrogen flow of six to seven SCCM and an air flow of 21 SCCM were used to provide a slight excess of oxygen at the operating pressure of about 40 millibar. A temperature of at least 250° C. was required to initiate the reaction. A Drierite® trap 710 size was optimized for the task.

An experiment was conducted for three hours at about 40 millibar absolute pressure with catalyst temperatures between 250-290° C. Hydrogen was successfully burned to generate water. Water sorption on the Drierite was 0.61 grams versus the theoretical amount of 0.84 grams (full combustion of hydrogen feed). Therefore, about 73% of the expected water yield was recovered in the trap. It is likely the remainder escaped through the low-pressure trap, which was operated at ambient temperature, since no hydrogen was detected at the vacuum pump outlet. Note that lift gas combustion may be accomplished using other tailored catalyst types.

This Example shows the feasibility of reducing lift gas volume required for balloon flight while generating ballast for daytime altitude control. The power requirements for pumping the lift gas and combustion air are highly sensitive to pressure. Consequently, the ability to conduct this operation at very low pressure is highly beneficial.

Example 4

Lift Gas Calculations

Reaction 1 (above) results in the production of a gas with an average molecular weight of 10.7, producing lift in air, which has an average molecular weight of 29. Thus, a balloon with a volume of 1 $m^3$ filled with $CO/H_2$ lift gas would generate a buoyancy of about 811 grams. Reaction 2 (above) produces a lift gas with an average molecular weight of 12.5, resulting in a buoyancy of about 729 grams in a 1 $m^3$ balloon. These values compare with the use of helium as a lift gas, which would produce a buoyancy of 1116 grams for the same volume balloon. Note that helium is transported at very high pressure (2200 psi) and in very heavy gas bottles/cylinders (e.g., K-bottles, ~55 kg each with 1.1 kg He). Using methanol to perform Reaction (1) or (2) on-site would allow balloon launches on Earth without the use of heavy gas bottles or rare and expensive helium.

As such, embodiments of the present invention produce a high-hydrogen-concentration lift gas without the large electrical requirement needed for electrolytic lift gas generators. Using a simple membrane separation to further enrich the hydrogen concentration of the lift gas, performance comparable to helium gas is obtained.

Example 5

Membrane Product Gas Separation

The following Example illustrates improvement of lift gas quality that can be obtained by separating higher molecular weight components from hydrogen in accordance with the present invention.

When carbon monoxide is present, the separated gas can also be used as a fuel. Therefore, the overall efficiency of the reformer apparatus embodiments herein can be improved by reducing the volume of lift gas required and by reducing the fuel required to support the reformer operation.

A number of gas separation methods, such as polymer membranes, high-temperature metallic membranes, or sorption methods (including pressure-swing or vacuum swing) can be used in the context of the invention. A Permea Prism® PPA-22 membrane was chosen for use in the present Example due to its availability, cost and compact nature.

Figure 8:
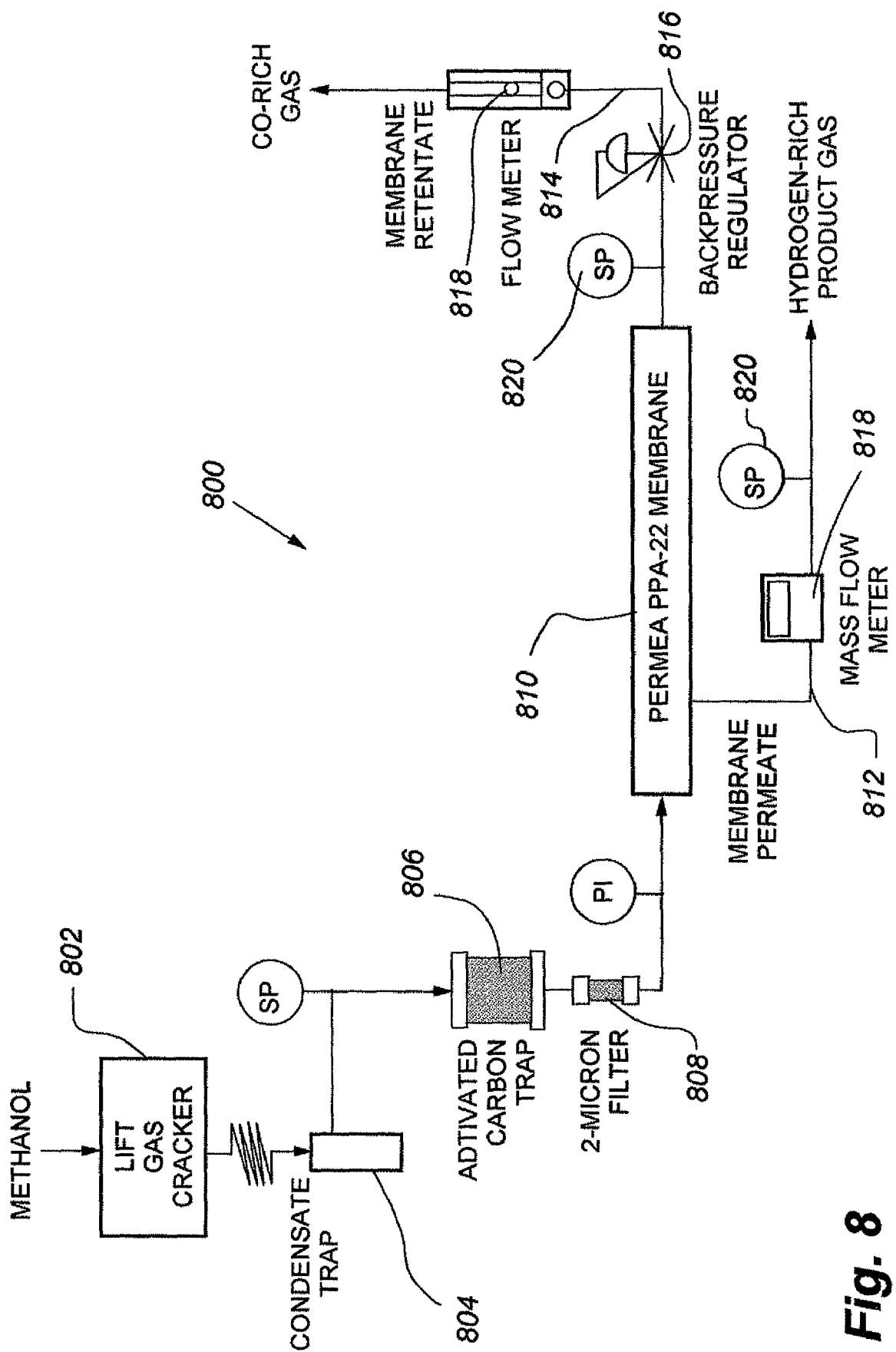
FIG. 8 illustrates a system for separating higher molecular weight components from lower molecular weight components of lift gas as generated by embodiments of the present invention.

FIG. 8 shows a schematic of a system 800 used for the membrane separation of gas components useful in balloon flight. Methanol was fed into a reformer apparatus 802 of the present invention, which vaporized and reformed the methanol to hydrogen, carbon monoxide, carbon dioxide and small amounts of dimethyl ether. The product gas was passed through a cold trap 804 to remove any unreacted methanol feed or condensable reaction products. The product gas was then passed through an activated carbon trap 806 to remove undesirable organic products that could foul the membrane. A filter 808 was installed to remove fine particles at the inlet of the membrane 810. The "cleaned" lift gas was then fed to the membrane 810, where the gas was separated into a hydrogen-rich stream 812 and a carbon-monoxide-rich stream (retentate) 814. A backpressure regulator 816 installed on the retentate was used to control the flow split between the two streams. An inlet pressure gage showed the backpressure for the system. Flow meters 818 and sample ports 820 were installed on the hydrogen-rich streams.

Figure 9:
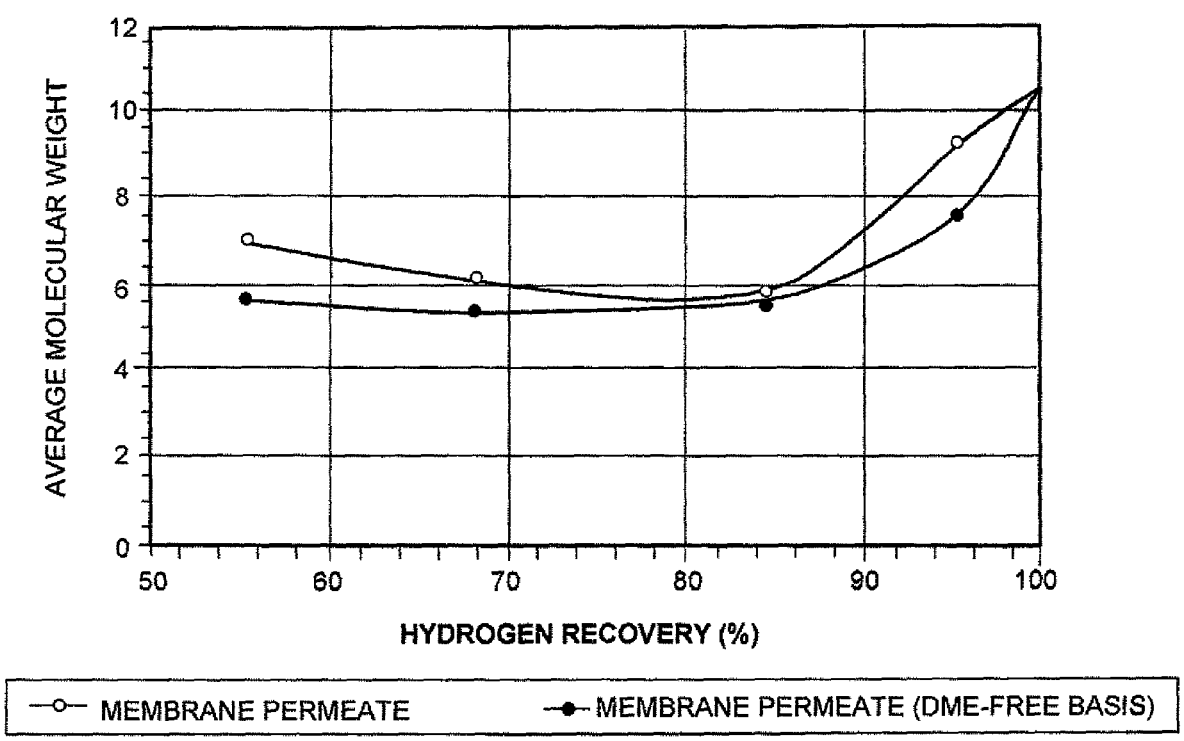
FIG. 9 is a plot of average molecular weight against hydrogen recovery achieved experimentally using membrane separation of lift gas in accordance with embodiments of the present invention.

The Permea PPA-22 membrane was about 2 inches in diameter and about 2 feet long (with a weight of about 1 kg). Results demonstrated that approximately 90% of the hydrogen generated by the reformer is recovered in a product with an average molecular weight of 6 to 7. FIG. 9 shows a plot of the results that illustrates the relationship between hydrogen recovery and average molecular weight of the lift gas.

The present Example illustrates the utility of separating out the higher molecular weight gas products from the lift gas. The modified lift gas provides higher quality lift to a balloon or other like device and can be used in combination with the reformer apparatus of the present invention.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention.

What is claimed is:

1. A method for producing lift gas comprising:
   reforming a fuel source in a reaction with water to generate lift gas for a balloon or other flexible container, the lift gas consisting essentially of hydrogen and carbon dioxide; and
   capturing the generated lift gas in the balloon or other flexible container;
   wherein the fuel source is selected from the group consisting of alcohols, olefins, paraffins, ethers, aromatic hydrocarbons, propane, diesel fuel, gasoline, unrefined commercial fuels, crude oil and natural gas; and
   wherein the captured lift gas can be used to launch the balloon or other flexible container or can be used to facilitate the buoyancy of the balloon or other flexible container during flight.

2. The method of claim 1, wherein the lift gas is produced on board the balloon or other flexible container during flight.

3. The method of claim 1, wherein the lift gas is used to launch the balloon or other flexible container.

4. The method of claim 1, further comprising causing the combustion of a combustible material with ambient oxygen for the release of energy, the released energy useful in driving the reforming of the fuel source.

5. The method of claim 4, wherein water produced during the combustion of a combustible material is collected and used as the water source during the reforming of a fuel source to generate lift gas.

6. The method of claim 4, wherein water produced during the combustion of a combustible material is collected and used as ballast to be dropped off the balloon during an appropriate period of time.

7. The method of claim 4, wherein the reformer fuel source and combustible material are the same.

8. The method of claim 7, wherein the fuel source and combustible material are selected from the group consisting of alcohol, ether, olefin, paraffin, or aromatic hydrocarbon.

9. The method of claim 4, wherein the reformer fuel source and combustible material are not the same.

10. The method of claim 4, wherein the combustion to provide energy to drive the reforming reaction is performed in a separate chamber which exchanges heat with the reformer.

11. The method of claim 4, wherein the combustion to provide energy to drive the reforming reaction is performed in the reforming reactor itself.

12. The method of claim 4 further comprising:
the contact of a catalyst to the reforming reaction fuel source wherein the catalyst reduces the temperature required to drive the reforming reaction generation of lift gas.

13. The method of claim 12, wherein the catalyst is a copper based catalyst.

14. The method of claim 12, wherein the catalyst is copper on alumina or copper on zinc oxide.

15. The method of claim 12, wherein the catalyst is an iron based catalyst, a nickel based catalyst, or a ruthenium based catalyst.

16. The method of claim 1, wherein the lift gas is produced by a ground based unit which remains on the ground but is used to enable balloon launch.

17. The method of claim 1, wherein the molecular weight of the lift gas is reduced by using a membrane or other gas separation system to remove some or all of the non-hydrogen components from the lift gas mixture.

18. The method of claim 1, wherein the lift gas comprises hydrogen and carbon dioxide.

19. The method of claim 1, wherein the reformed fuel is an alcohol, and wherein said alcohol is premixed with water before reformation in appropriate proportions, thereby allowing the reformer to be fed with a single feed stream.

20. The method of claim 1, wherein the heat from the hot exhaust gas output from the reformer reactor is used to generate steam to feed the reformer.

21. The method of claim 11, wherein the heat from the hot exhaust gas output from the combined combustion/reformer reactor is used to generate steam to feed the combustion/reformer reactor.

22. The method of claim 19, wherein the heat from the hot exhaust gas output from the reformer reactor is used to heat the combined alcohol/water mixture feeding the reformer.

* * * * *